(12) United States Patent
Farooq

(10) Patent No.: US 11,790,385 B2
(45) Date of Patent: Oct. 17, 2023

(54) ESG FORECASTING

(71) Applicant: S&P Global Inc., New York, NY (US)

(72) Inventor: Nadia Farooq, New York, NY (US)

(73) Assignee: S&P Global Inc., New York, NY (US)

( * ) Notice: Subject to any disclaimer, the term of this patent is extended or adjusted under 35 U.S.C. 154(b) by 200 days.

(21) Appl. No.: 17/301,745

(22) Filed: Apr. 13, 2021

(65) Prior Publication Data
US 2022/0327567 A1  Oct. 13, 2022

(51) Int. Cl.
G06Q 30/02 (2023.01)
G06Q 40/06 (2012.01)
G06Q 30/0201 (2023.01)
G06Q 10/04 (2023.01)

(52) U.S. Cl.
CPC ......... *G06Q 30/0206* (2013.01); *G06Q 10/04* (2013.01); *G06Q 30/0201* (2013.01); *G06Q 40/06* (2013.01)

(58) Field of Classification Search
None
See application file for complete search history.

(56) References Cited

U.S. PATENT DOCUMENTS

| | | | | |
|---|---|---|---|---|
| 3,727,756 A | * | 4/1973 | Koluch | C03B 23/0013 221/68 |
| 6,272,483 B1 | * | 8/2001 | Joslin | G06Q 10/06 706/62 |
| 8,521,611 B2 | * | 8/2013 | Nguyen | G06Q 30/0635 705/26.4 |
| 2010/0082302 A1 | * | 4/2010 | Garudadri | H03M 7/30 702/189 |
| 2012/0316916 A1 | * | 12/2012 | Andrews | G06Q 50/01 705/7.29 |
| 2017/0249389 A1 | * | 8/2017 | Brovinsky | G06Q 30/02 |
| 2019/0362427 A1 | * | 11/2019 | Chen | G06Q 10/067 |
| 2020/0302540 A1 | * | 9/2020 | Xiu | G06F 40/30 |
| 2021/0169389 A1 | * | 6/2021 | Moskowitz | A61B 5/28 |
| 2021/0264520 A1 | * | 8/2021 | Cummings | G06Q 40/12 |
| 2021/0303634 A1 | * | 9/2021 | Choi | G06F 16/90332 |
| 2022/0261819 A1 | * | 8/2022 | Litvak-Hinenzon | G06Q 30/018 |
| 2022/0277044 A1 | * | 9/2022 | Kim | G06F 40/295 |

(Continued)

OTHER PUBLICATIONS

Farooq, "ESG Supply Chain Forecasting," U.S. Appl. No. 17/301,749, filed Apr. 13, 2021, 47 pages.

(Continued)

*Primary Examiner* — Jamie H Austin
(74) *Attorney, Agent, or Firm* — Yee & Associates, P.C.

(57) ABSTRACT

A method to forecast financial performance of companies is provided. The method comprises retrieving from a database news articles related to a number of companies published within a predefined time period. The news articles are classified as either ESG articles or non-ESG articles and then vectorized. A subset of relevant non-ESG articles are selected. The ESG and selected non-ESG articles are fed into a sentiment scoring model, which generates sentiment scores for the companies over the predefined time period. The sentiment scores are fed into an ESG forecast model along with historical market data and ESG data related to the companies. The ESG forecast model forecasts the financial performance of the companies in relation to ESG policies.

27 Claims, 6 Drawing Sheets

(56) References Cited

U.S. PATENT DOCUMENTS

2022/0327439 A1* 10/2022 Farooq ................... G06Q 50/26
2022/0327567 A1* 10/2022 Farooq ............... G06Q 30/0201

OTHER PUBLICATIONS

Office Action, dated Apr. 20, 2022, regarding U.S. Appl. No. 17/301,749, 12 pages.
Notice of Allowance, dated Jul. 13, 2022, regarding U.S. Appl. No. 17/301,749, 9 pages.

* cited by examiner

ESG FORECASTING

CROSS-REFERENCE TO RELATED APPLICATION

This application is related to U.S. patent application Ser. No. 17/301,749, filed Apr. 13, 2021, now U.S. Pat. No. 11,488,075, issued Nov. 1, 2022, entitled "ESG Supply Chain Forecasting," the entirety of which are incorporated herein by reference.

BACKGROUND INFORMATION

1. Field

The present disclosure relates generally to an improved computing system, and more specifically to a method of forecasting the performance of companies within the context of ESG parameters.

2. Background

Environmental, Social and Governance (ESG) investing, or sustainable investing, refers to a type of investing that seek positive returns and long-term impact on society, environment, and the performance of the business. ESG investing integrates the environmental, social, and governance risks into the traditional investment process. Capital market investors also considers ESG a subset of non-financial indicators to evaluate corporate behavior when investment decisions are made.

As more investors become aware of the impact made by their investments many investors are starting to become interested in the role their assets can have in regard to global ESG issues. Moreover, capital markets seem to favor ESG investing, and some studies have found that ESG investments outperform conventional investments while showing a lower downside risks. However, environmental, social and governance considerations can mean different things to different people.

Therefore, it would be desirable to have a method and apparatus that take into account at least some of the issues discussed above, as well as other possible issues.

SUMMARY

An illustrative embodiment provides a computer-implemented method of forecasting financial performance of companies. The method comprises retrieving from a database a number of news articles related to a number of companies published within a predefined time period and vectorizing the news articles. The news articles are fed into a sentiment scoring model, which generates a number of sentiment scores for the companies over the predefined time period. The sentiment scores are fed into an ESG forecast model along with historical market data and ESG data related to the companies. The ESG forecast model, financial performance of the companies in relation to ESG policies.

Another illustrative embodiment provides a system for forecasting financial performance of companies. The system comprises a storage device configured to store program instructions and one or more processors operably connected to the storage device and configured to execute the program instructions to cause the system to: retrieve from a database a number of news articles related to a number of companies published within a predefined time period; vectorize the news articles; feed the news articles into a sentiment scoring model; generate, by the sentiment scoring model, a number of sentiment scores for the companies over the predefined time period; feed the sentiment scores, and historical market data and ESG data related to the companies into an ESG forecast model; and forecast, by the ESG forecast model, financial performance of the companies in relation to ESG policies.

Another illustrative embodiment provides a computer program product for forecasting financial performance of companies. The computer program product comprises a computer-readable storage medium having program instructions embodied thereon to perform the steps of: retrieving from a database a number of news articles related to a number of companies published within a predefined time period; vectorizing the news articles; feeding the news articles into a sentiment scoring model; generating, by the sentiment scoring model, a number of sentiment scores for the companies over the predefined time period; feeding the sentiment scores, and historical market data and ESG data related to the companies into an ESG forecast model; and forecasting, by the ESG forecast model, financial performance of the companies in relation to ESG policies.

Another illustrative embodiment provides a computer-implemented method to generate sentiment scores. The method comprises retrieving from a database a number of news articles related to a number of companies published within a predefined time period. The news articles are classified as either Environmental, Social, and Governance (ESG) articles or non-ESG articles and then vectorized. A subset of relevant articles are selected from the non-ESG articles. The ESG articles and the subset of relevant non-ESG articles are fed into a sentiment scoring model, which generates a number of sentiment scores for the companies over the predefined time period.

Another illustrative embodiment provides a system for generating sentiment scores. The system comprises a storage device configured to store program instructions and one or more processors operably connected to the storage device and configured to execute the program instructions to cause the system to: retrieve from a database a number of news articles related to a number of companies published within a predefined time period; classify the news articles as either Environmental, Social, and Governance (ESG) articles or non-ESG articles; vectorize the ESG articles and non-ESG articles; select a subset of relevant articles from the non-ESG articles; feed the ESG articles and the subset of relevant non-ESG articles into a sentiment scoring model; and generate, by the sentiment scoring model, a number of sentiment scores for the companies over the predefined time period.

Another illustrative embodiment provides a computer program product for generating sentiment scores. The computer program product comprises a computer-readable storage medium having program instructions embodied thereon to perform the steps of: retrieving from a database a number of news articles related to a number of companies published within a predefined time period; classifying the news articles as either Environmental, Social, and Governance (ESG) articles or non-ESG articles; vectorizing the ESG articles and non-ESG articles; selecting a subset of relevant articles from the non-ESG articles; feeding the ESG articles and the subset of relevant non-ESG articles into a sentiment scoring model; and generating, by the sentiment scoring model, a number of sentiment scores for the companies over the predefined time period.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that ESG investing relies on ratings that help to assess a company's behavior and policies regarding its environmental performance, social impact and governance issues. The illustrative embodiments recognize and take into account that the ESG investing emphasizes certain environmental, social, and corporate governance factors that impact business, which gives investors a more holistic view of companies and help to mitigate risk as well as identify potential opportunity.

The illustrative embodiments also recognize and take into account that ESG investing are integral with the United Nations' sustainable development goals.

The illustrative embodiments also recognize and take into account that there is no unified criteria to determine whether a company is engaging in good ESG practices.

"ESG criteria" refers to an assessment that considers environmental, social, and governance factors as whole. The environmental factors determine a company's and industry's impact on environmental concerns and may focus on, e.g., waste, pollution, resource depletion, greenhouse gas emission, deforestation, and climate change. Social factors look at how a company treats people and focuses on, e.g., employee relations, diversity, working conditions, local communities, health and safety, and conflict. Governance factors concerns corporate polices and how a company is governed, which may focus on, e.g., tax strategy, executive remuneration, donations, political lobbying, corruption and bribery, diversity, and structure.

The UN's Sustainable Development Goals (SDGs) are a collection of 17 interrelated global goals designed to call action to end poverty, protect the planet and ensure that all people can afford peace and prosperity by 2030. Specifically, the 17 goals include No Poverty, Zero Hunger, Good Health and Well-being, Quality Education, Gender Equality, Clean Water and Sanitation, Affordable and Clean Energy, Decent Work and Economic Growth, Industry, Innovation and Infrastructure, Reducing Inequality, Sustainable Cities and Communities, Responsible Consumption and Production, Climate Action, Life Below Water, Life on Land, Peace Justice, and Strong Institutions, Partnership for the Goals.

The illustrative embodiments helps match investors with investments related to the UN's SDGs.

The illustrative embodiments provide a method of forecasting the performance of companies with regard to ESG factors. Sentiment scores are derived for the companies based on news articles that contain ESG content related to the companies. The forecast method combines these ESG sentiment scores with historical market data and ESG data to project the future prospects of companies based on ESG factors and not merely financial factors.

Figure 1:
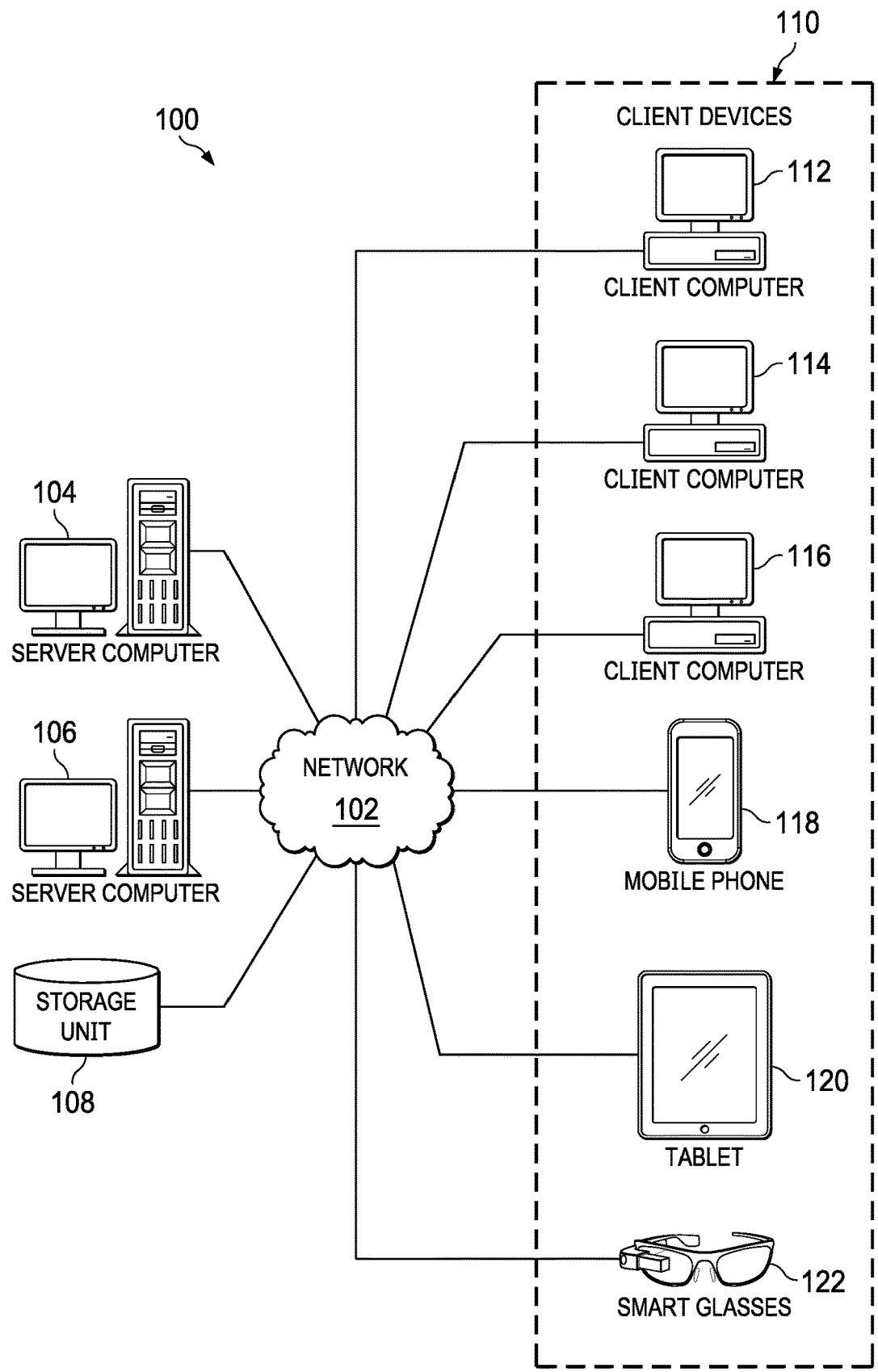
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
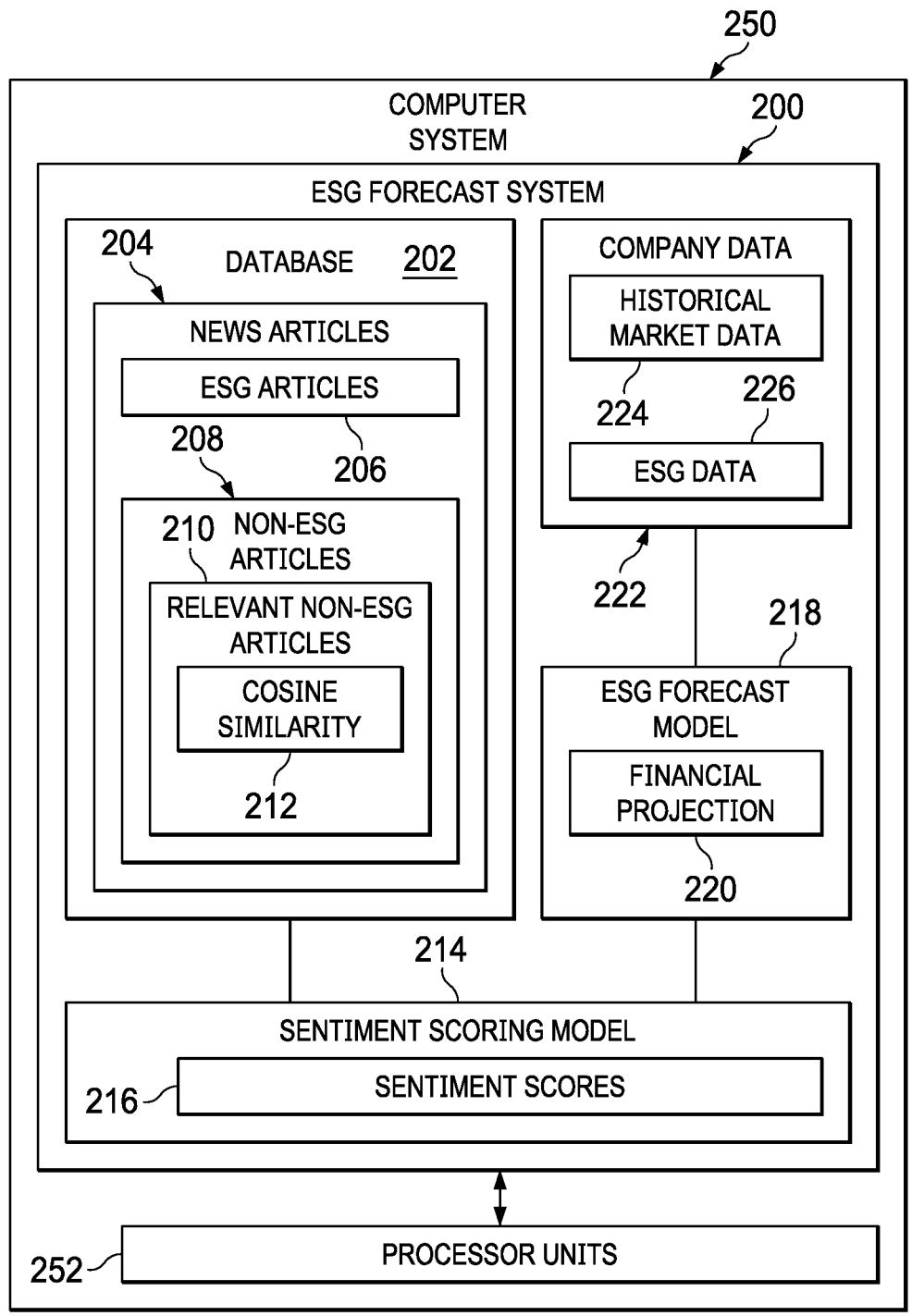
FIG. 2 is a block diagram of an ESG forecast system depicted in accordance with an illustrative embodiment.

FIG. 2 is a block diagram of an ESG forecast system depicted in accordance with an illustrative embodiment. ESG forecast system 200 might be implemented in network data processing system 100 in FIG. 1.

In this illustrative example, the ESG forecast system 200 includes a database 202. Database 202 can be an internal or commercial database that contains market intelligence information. Within the database 202 is a number of news articles 204 that are available for retrieval. The news articles 204 are related to a specific company or companies over a predefined period of time. The companies might comprise a single company, a group of companies, or a combination of multiple business entities such as, for example, a conglomerate that includes a parent company and many subsidiaries or affiliates. News articles 204 can be retrieved by a sentiment scoring model 214 using any desirable method, for example, through an application programming interface (API) using JavaScript Object Notation (JSON) format query.

News articles 214 can be classified into ESG articles 206 or non-ESG articles 208 based on their textual content. The Non-ESG articles 208 might also include a subset of relevant non-ESG article 210. The relevant non-ESG articles 210 might be based on the extent of their similarity to the ESG articles 206. For example, a similarity score can be computed for each of the non-ESG articles 208 relative to the ESG articles 206. Only non-ESG articles that have a similarity score that exceeds a predefined threshold will be selected as a relevant non-ESG article 210. The similarity scores between articles can be calculated by any desirable method that computes the distance between two articles, e.g., cosine similarity 212.

Sentiment scoring model 214 might be configured to take the ESG articles 206 and relevant non-ESG articles 210 as inputs and compute a number of sentiment scores 216 for the companies in question over the predefined period of time as the output. In this illustrative example, the sentiment scores 216 are numbers on scale of −1 to 1, where −1 represents the most negative sentiments and 1 represents the most positive sentiment.

The ESG forecast system 200 also comprises an ESG forecast model 218 that forecasts the financial performance 220 of companies in relation to ESG policies. In this example, ESG forecast model 218 uses sentiment scores 216 and company data 222 as input and projects the financial performance 220 of the company as output.

Company data 222 might include any data related to the companies over the predefined period of time. For example, company data 222 can include historical market data 224 such as historical stock price, stock trading volume, historical volatility, or any technical indicator related to the stock performance of the company of interests. In addition, company data 222 can also include ESG data 226 that represents historical ESG performance of the companies in question. ESG data 226 might include, for example, an environmental score, a social score, a governance score, a carbon emission volume, and a greenhouse gas emission volume.

ESG forecast system 200 can be implemented in software, hardware, firmware, or a combination thereof. When software is used, the operations performed by ESG forecast system 200 can be implemented in program code configured to run on hardware, such as a processor unit. When firmware is used, the operations performed by ESG forecast system 200 can be implemented in program code and data and stored in persistent memory to run on a processor unit. When hardware is employed, the hardware may include circuits that operate to perform the operations in ESG forecast system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components for ESG forecast system 200 can be located in computer system 250, which is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

For example, ESG forecast system 200 can run on one or more processors 252 in computer system 250. s used herein a processor unit is a hardware device and is comprised of hardware circuits such as those on an integrated circuit that respond and process instructions and program code that operate a computer. When one or more processors 252 execute instructions for a process, one or more processors 252 that can be on the same computer or on different computers in computer system 250. In other words, the process can be distributed between processors 252 on the same or different computers in computer system 250. Further, one or more processors 252 can be of the same type or different type of processors 252. For example, one or more processors 252 can be selected from at least one of a single core processor, a dual-core processor, a multi-processor core, a general-purpose central processing unit (CPU), a graphics processing unit (GPU), a digital signal processor (DSP), or some other type of processor.

There are three main categories of machine learning: supervised, unsupervised, and reinforced learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforced learning (RL) methods learn from feedback to re-learn/retrain the models. Algorithms are used to train the predictive model through interacting with the environment using measurable performance criteria.

Figure 3:
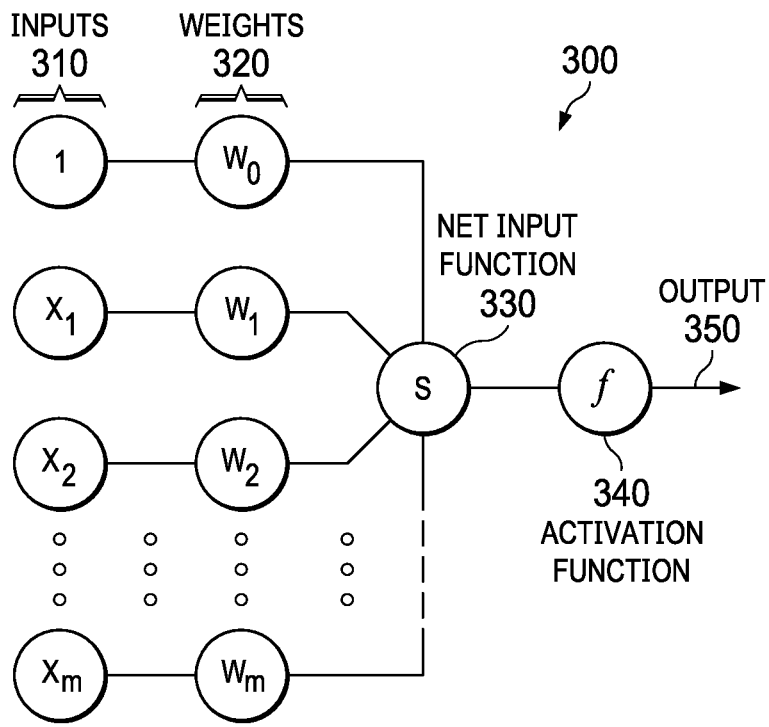
FIG. 3 depicts a diagram illustrating a node in a neural network in which illustrative embodiments can be implemented.

FIG. 3 depicts a diagram illustrating a node in a neural network in which illustrative embodiments can be implemented. Node 300 combines multiple inputs 310 from other nodes. Each input 310 is multiplied by a respective weight 320 that either amplifies or dampens that input, thereby assigning significance to each input for the task the algorithm is trying to learn. The weighted inputs are collected by a net input function 330 and then passed through an activation function 340 to determine the output 350. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Figure 4:
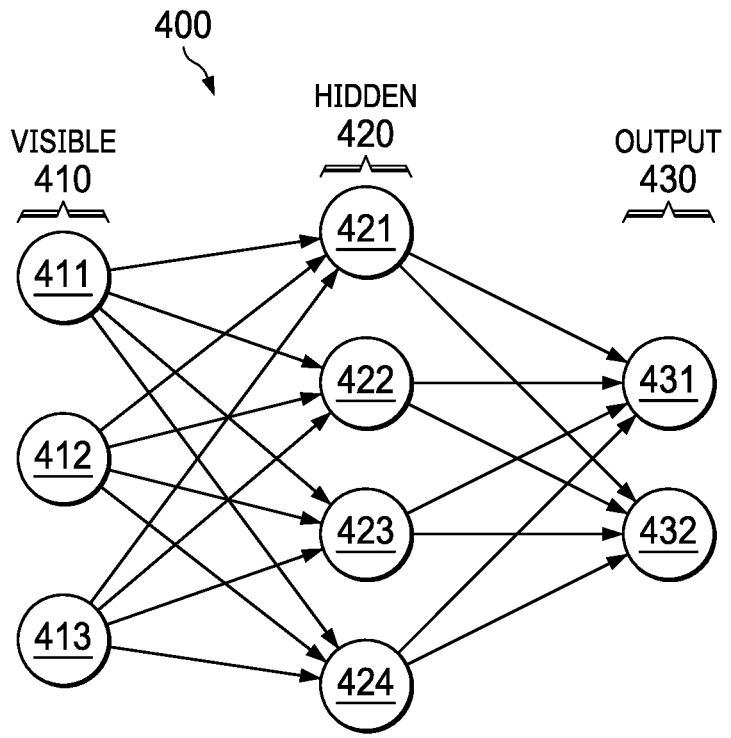
FIG. 4 depicts a diagram illustrating a neural network in which illustrative embodiments can be implemented.

FIG. 4 depicts a diagram illustrating a neural network in which illustrative embodiments can be implemented. As shown in FIG. 4, the nodes in the neural network 400 are divided into a layer of visible nodes 410, a layer of hidden nodes 420, and a layer of output nodes 430. The nodes in these layers might comprise nodes such as node 300 in FIG. 3. The visible nodes 410 are those that receive information from the environment (i.e., a set of external training data). Each visible node in layer 410 takes a low-level feature from an item in the dataset and passes it to the hidden nodes in the next layer 420. When a node in the hidden layer 420 receives an input value x from a visible node in layer 410 it multiplies x by the weight assigned to that connection (edge) and adds it to a bias b. The result of these two operations is then fed into an activation function which produces the node's output.

In fully connected feed-forward networks, each node in one layer is connected to every node in the next layer. For example, node 421 receives input from all of the visible nodes 411, 412, and 413 each x value from the separate nodes is multiplied by its respective weight, and all of the products are summed. The summed products are then added to the hidden layer bias, and the result is passed through the activation function to produce output to output nodes 431 and 432 in output layer 430. A similar process is repeated at hidden nodes 422, 423, and 424. In the case of a deeper neural network, the outputs of hidden layer 420 serve as inputs to the next hidden layer.

Neural network layers can be stacked to create deep networks. After training one neural net, the activities of its hidden nodes can be used as inputs for a higher level, thereby allowing stacking of neural network layers. Such stacking makes it possible to efficiently train several layers of hidden nodes. Examples of stacked networks include deep belief networks (DBN), convolutional neural networks (CNN), and recurrent neural networks (RNN).

Sentiment scoring model 214 and ESG forecast model 218 in ESG forecast system 200 might be implemented with artificial neurons/nodes such as node 300 in FIG. 3, which can be organized into neural network such as network 400 in FIG. 4.

Figure 5:
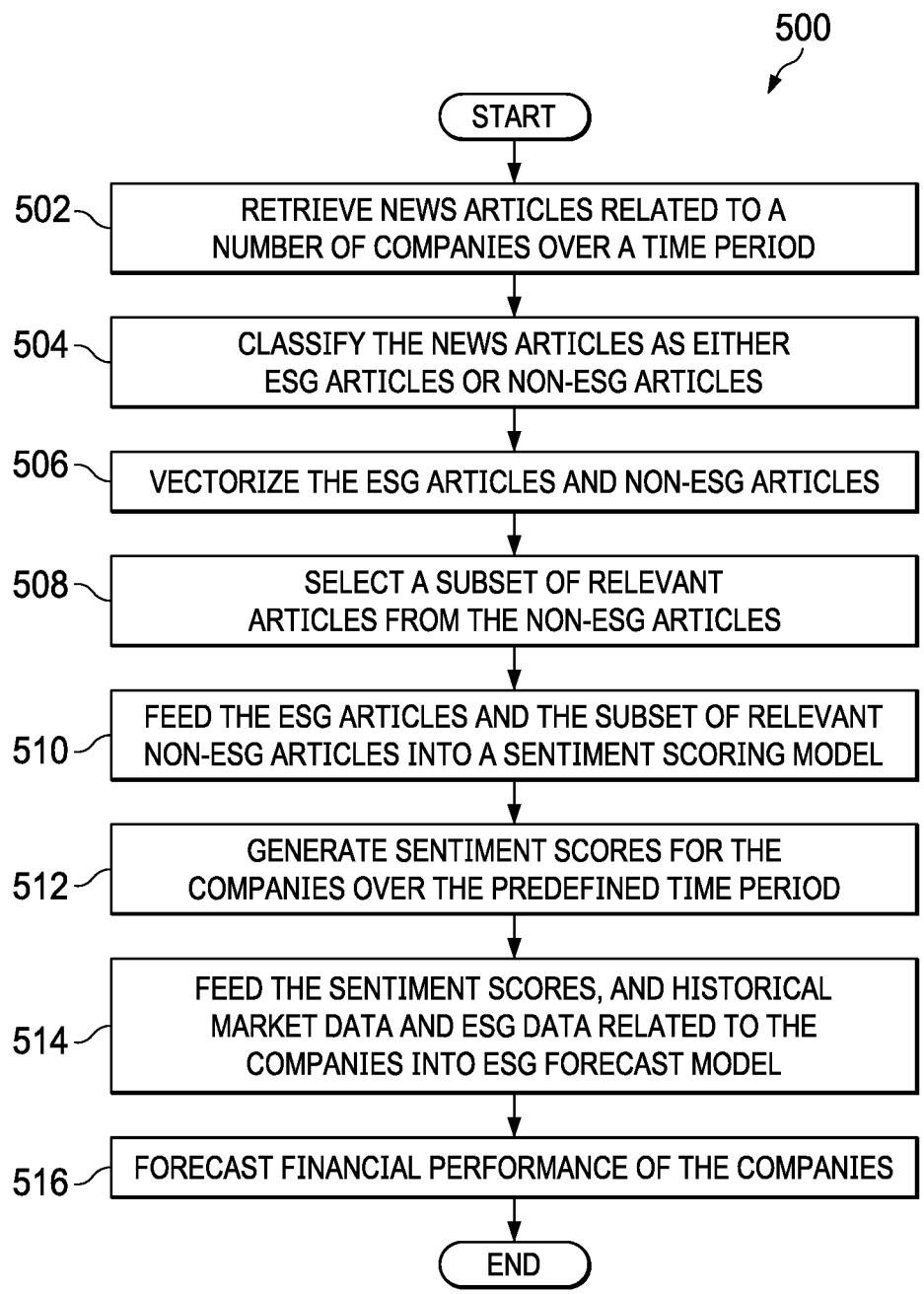
FIG. 5 depicts a flowchart illustrating a process for ESG forecasting in accordance with an illustrative embodiment.

FIG. 5 depicts a flowchart illustrating a process for ESG forecasting in accordance with an illustrative embodiment. Process 500 can be implemented in hardware, software, or both. When implemented in software, the process can take the form of program code that is run by one of more processor units located in one or more hardware devices in one or more computer systems. Process 500 might be implemented in ESG forecast system 200 in FIG. 2.

Process 500 begins by retrieving a number of news articles related to a number of companies published within a predefined period of time (step 502). The news articles may be retrieved from any desired database that contains the information of interests, for example, from an internal database or a commercial database. In this illustrative example, the news articles retrieved may be related to a company, a group of related companies, or a group of unrelated companies. The companies may comprise single companies, a group of companies (i.e., an industry), or a combination of multiple business entities such as a parent company and subsidiaries. The retrieved news articles may be extracted in text format and limited to articles from the predefined period of time, for example, within a day, a week, a month, or a year. In one illustrative example, the articles may be retrieved by any suitable method, for example, they articles may be retrieved from a database via an API.

Process 500 then classifies the news articles as either ESG articles or non-ESG articles (step 504). In one illustrative example, the retrieved articles are classified into categories based on their textual content. In another illustrative example, the retrieved articles are already labelled with tags that reflects their contents. The news articles can be classified in number of different tables within a database. An API query can be written to navigate from one table to another and filter on the ESG category.

The ESG articles and non-ESG articles are then vectorized (step 506). The textual content of ESG articles and non-ESG articles may be vectorized by using any suitable method such as, e.g., binary term frequency, normalized term frequency, or term frequency-inverse document frequency.

Process 500 then selects a subset of relevant articles from the non-ESG articles (step 508). The subset of relevant non-ESG articles have a similarity to the ESG articles above a specified threshold. Process 500 computes a similarity score for each of the non-ESG articles by comparing the non-ESG articles to the ESG articles. The selection of relevant non-ESG articles may be based on a number of criteria. In one embodiment, only non-ESG articles with a similarity score above the predefined threshold are selected. Alternatively, a top number of non-ESG articles most similar to the ESG articles are selected, e.g., articles with the highest 100 similarity scores. The purpose of including a subset of non-ESG articles that are similar to the ESG articles is to cover as much information as possible to have a more comprehensive understanding of relevant factors needed for the forecast model.

In this illustrative example, the similarity score between the non-ESG articles and ESG articles may be calculated by any method that measures the distance between two inputs such as, e.g., cosine similarity, Manhattan distance, Euclidean distance, Minkowski distance, or Jaccard similarity.

Process 500 feeds the ESG articles and the subset of relevant non-ESG articles into a sentiment scoring model, which may be implemented in an artificial neural network (step 510). As explained above, the ESG articles and the subset of relevant non-ESG articles are already vectorized. The sentiment score may be calculated by using any suitable sentiment analysis techniques, for example, a knowledge-based technique, or a statistical method such as semantic orientation or Vader sentiment analysis.

The sentiment scoring model generates a number of sentiment scores for the companies over the predefined time period (step 512). The computed sentiment score of the companies may be associated with particular date, month, or year. In this illustrative example, the sentiment scores are on a scale of −1 to 1, where −1 represents the most negative sentiment and 1 represents the most positive sentiment. All features are subsequently combined into one data frame for further data processing, for instance, the data frame may include company name, sentiment score, and date.

Process 500 feeds the generated sentiment scores along with a number of historical market data and ESG data related to the companies into an ESG forecast model (step 514). The ESG forecast model may also be implemented in an artificial neural network. In this illustrative example, the historical market data may be any market data associated with the companies. The market data may comprise market data associate with the stock of companies, such as, e.g., historical trading volume for the companies, historical stock prices, volatility of the stock, any fundamental indicators, or any technical indicators. The ESG data may be any data related to Environmental, Social and Governance data available either from an internal database or commercial database. For example, the ESG data related the companies may comprise at least one of environmental score, social score, governance score, carbon emission volume, or greenhouse gas emission volume. Such ESG data may be supplied from a database such as, e.g., S&P Trucost.

The ESG forecast model forecasts the financial performance of the companies in relation to ESG policies based on the sentiment score, historical market data and ESG data (step 516). The projection of financial performance of the companies may be related to any financial aspects of the companies of interests, such as future stock prices, or future EPS (earning per shares). It should also be understood that the projection of financial performance of the companies is only one embodiment of the present disclosure. The ESG forecast model may also be used to project non-financial related performance of the companies of interests. Process 500 terminates thereafter.

Figure 6:
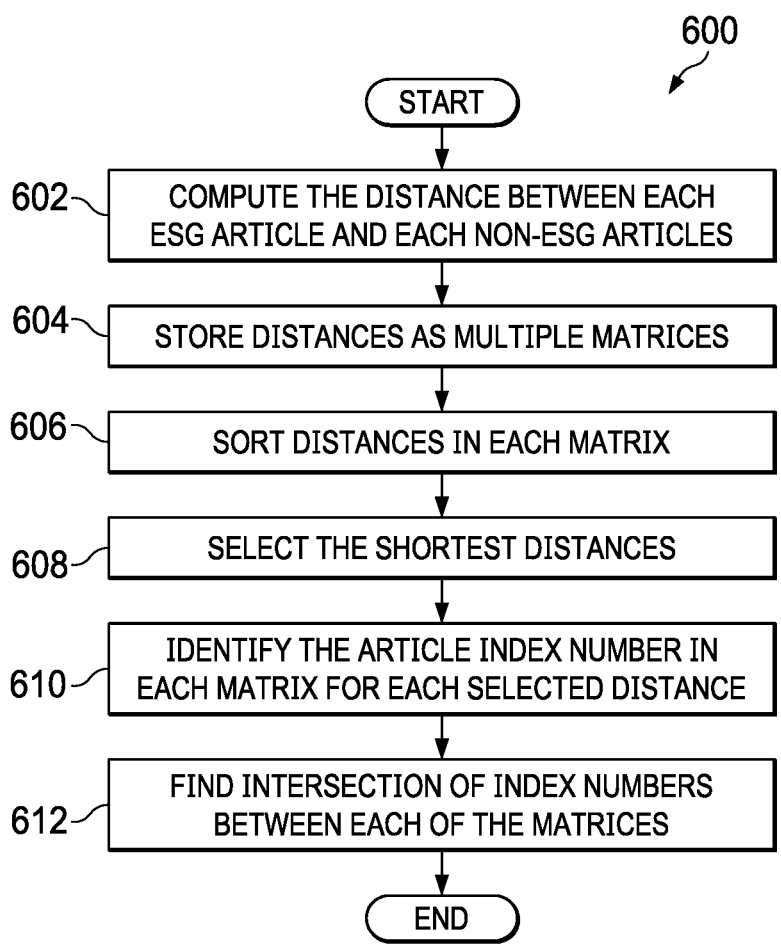
FIG. 6 depicts a flowchart illustrating a process of selecting relevant non-ESG articles in accordance with an illustrative embodiment.

FIG. 6 depicts a flowchart illustrating a process of selecting relevant non-ESG articles in accordance with an illustrative embodiment. Process 600 can be implemented in hardware, software, or both. When implemented in software, the process can take the form of program code that is run by one or more processor units located in one or more hardware devices in one or more computer systems. Process 600 might be an example of a more detailed description of step 508 in FIG. 5.

Process 600 begins by computing the distance between each ESG article and each non-ESG article (step 602). The distances are stored as multiple matrices in a cosine similarity list object (step 604).

The distances in each matrix are then sorted by shortest distance (step 606), and a top number (e.g., 100) of shortest distances is selected (step 608). Alternatively, the distances below a specified threshold might be selected.

Among the selected distances, process 600 identifies the article index number in each matrix for each selected distance computed (step 610). Each article in a table in a database is identified by a unique number.

Process 600 then finds the intersection of index numbers between each of the matrices (step 612), which comprise the final list of relevant non-ESG articles. Process 600 ends thereafter.

Figure 7:
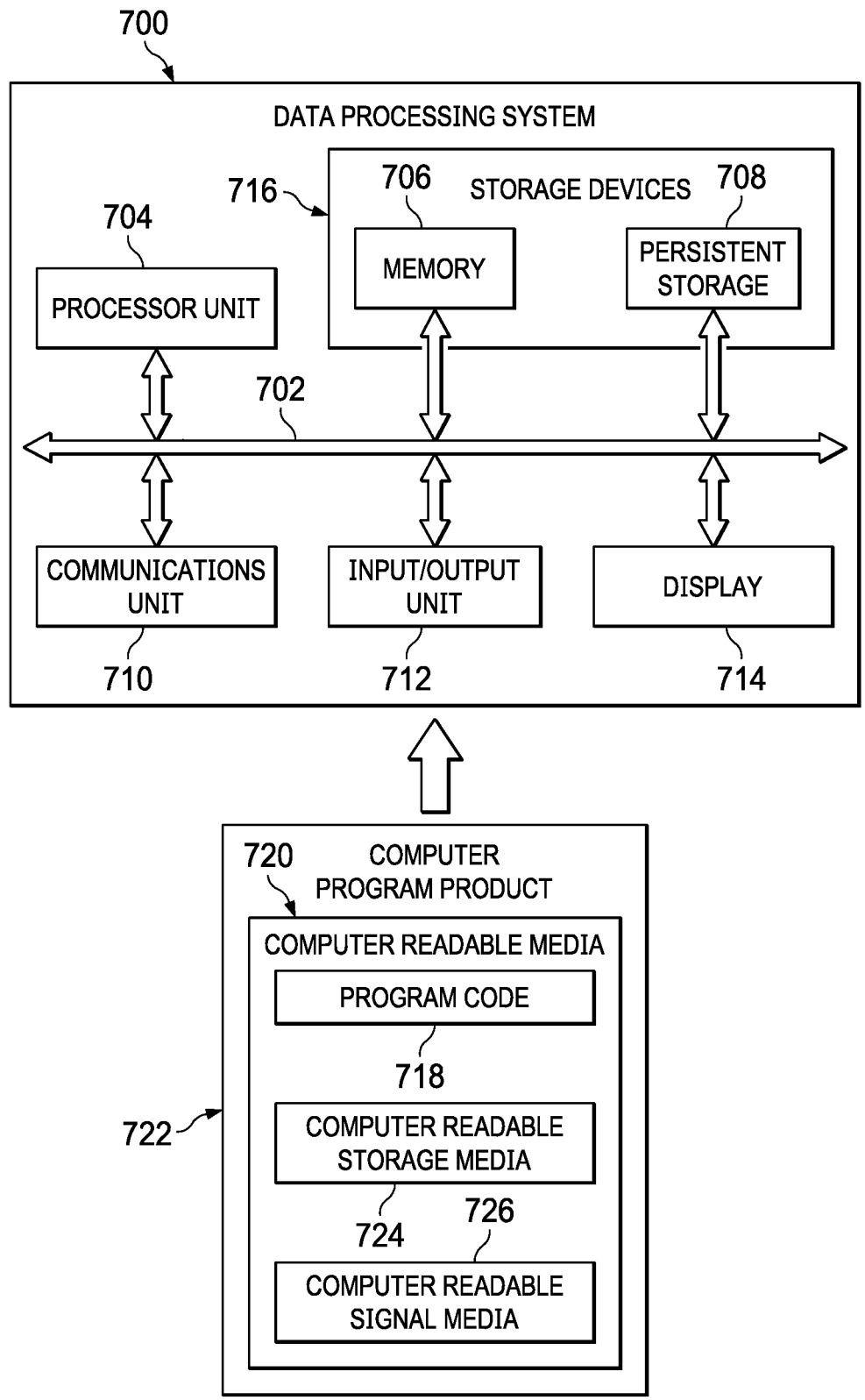
FIG. 7 is a block diagram of a data processing system in accordance with an illustrative embodiment.

Turning now to FIG. 7, an illustration of a block diagram of a data processing system is depicted in accordance with an illustrative embodiment. Data processing system 700 may be used to implement servers 104 and 106 and client devices 110 in FIG. 1, as well as computer system 250 in FIG. 2. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation. In an embodiment, processor unit 704 comprises one or more conventional general-purpose central processing units (CPUs). In an alternate embodiment, processor unit 704 comprises one or more graphical processing units (GPUs).

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 716, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708. Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718. Computer readable storage media 724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 718 may be transferred to data processing system 700 using computer-readable signal media 726. Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of forecasting financial performance of companies, the method comprising:
using a number of processors to perform the steps of:
retrieving from a database, through an application programming interface via JavaScript Object Notation format query, a number of news articles related to a number of companies published within a predefined time period;
vectorizing the news articles;
creating an artificial neural network comprising a sentiment scoring model and an environmental, social, and governance forecast model implemented as nodes in the artificial neural network;
feeding the news articles into the sentiment scoring model;
generating, by the sentiment scoring model implemented in an artificial neural network that employs semantic orientation or Vader sentiment analysis, a number of sentiment scores for the companies over the predefined time period;
feeding the sentiment scores, and historical market data and environmental, social, and governance data related to the companies into the environmental, social, and governance forecast model; and
forecasting, by the environmental, social, and governance forecast model, financial performance of the companies in relation to environmental, social, and governance policies comprising ratings assessing the companies' behavior and policies regarding their environmental performance, social impact and governance issues.

2. The method of claim 1, further comprising:
classifying the news articles as either environmental, social, and governance articles or non-environmental, social, and governance particles; and
selecting a subset of relevant articles from the non-environmental, social, and governance articles.

3. The method of claim 2, wherein the subset of relevant non-environmental, social, and governance articles comprises a top number of non-environmental, social, and governance articles most similar to the environmental, social, and governance articles.

4. The method of claim 2, wherein the subset of relevant non-environmental, social, and governance articles have a similarity to the environmental, social, and governance articles above a specified threshold.

5. The method of claim 2, wherein selecting the subset of relevant non-environmental, social, and governance articles is performed via cosine similarity scoring.

6. The method of claim 1, wherein the sentiment scores are on a scale of −1 to 1.

7. The method of claim 1, wherein the historical market data comprises stock trading volume for the companies.

8. The method of claim 1, wherein the environmental, social, and governance data comprises at least one of:
environmental score;
social score;
governance score;
carbon emission volume; or
greenhouse gas emission volume.

9. The method of claim 1, wherein the news articles are extracted in text format.

10. The method of claim 1, wherein vectorizing the news articles is performed via term frequency-inverse document frequency technique.

11. A system for forecasting financial performance of companies, the system comprising:
a storage device configured to store program instructions; and
one or more processors operably connected to the storage device and configured to execute the program instructions to cause the system to:
retrieve from a database, through an application programming interface via JavaScript Object Notation format query, a number of news articles related to a number of companies published within a predefined time period;
vectorize the news articles;
create an artificial neural network comprising a sentiment scoring model and a environmental, social, and governance forecast model implemented as nodes in the artificial neural network;
feed the news articles into the sentiment scoring model;
generate, by the sentiment scoring model implemented in an artificial neural network that employs semantic orientation or Vader sentiment analysis, a number of sentiment scores for the companies over the predefined time period;
feed the sentiment scores, and historical market data and environmental, social, and governance data related to the companies into the environmental, social, and governance forecast model; and
forecast, by the environmental, social, and governance forecast model, financial performance of the companies in relation to environmental, social, and governance policies comprising ratings that assess the companies' behavior and policies regarding their environmental performance, social impact and governance issues.

12. The system of claim 11, wherein the processors further execute program instructions to:
classify the news articles as either environmental, social, and governance articles or non-environmental, social, and governance articles; and
select a subset of relevant articles from the non-environmental, social, and governance articles.

13. A computer program product for forecasting financial performance of companies, the computer program product comprising:
a computer-readable storage media having program instructions embodied thereon to perform the steps of:
retrieving from a database, through an application programming interface via JavaScript Object Notation format query, a number of news articles related to a number of companies published within a predefined time period;
vectorizing the news articles;
creating an artificial neural network comprising a sentiment scoring model and a environmental, social, and governance forecast model implemented as nodes in the artificial neural network;
feeding the news articles into sentiment scoring model;
generating, by the sentiment scoring model implemented in an artificial neural network that employs semantic orientation or Vader sentiment analysis, a number of sentiment scores for the companies over the predefined time period;
feeding the sentiment scores, and historical market data and environmental, social, and governance data related to the companies into the environmental, social, and governance forecast model; and forecasting, by the environmental, social, and governance forecast model, financial performance of the companies in relation to environmental, social, and governance policies comprising ratings assessing the companies' behavior and policies regarding their environmental performance, social impact and governance issues.

14. The computer program product of claim 13, further comprising instructions for:
classifying the news articles as either environmental, social, and governance articles or non-environmental, social, and governance articles; and
selecting a subset of relevant articles from the non-environmental, social, and governance articles.

15. A computer-implemented method to generate sentiment scores, the method comprising:
using a number of processors to perform the steps of:
retrieving from a database, through an application programming interface via JavaScript Object Notation format query, a number of news articles related to a number of companies published within a predefined time period;
creating an artificial neural network comprising a sentiment scoring model and a environmental, social, and governance forecast model implemented as nodes in the artificial neural network;
classifying the news articles as either environmental, social, and governance articles or non-environmental, social, and governance articles;
vectorizing the environmental, social, and governance articles and non-environmental, social, and governance articles;
selecting a subset of relevant articles from the non-environmental, social, and governance articles;
feeding the environmental, social, and governance articles and the subset of relevant non-environmental, social, and governance articles into the sentiment scoring model; and
generating, by the sentiment scoring model implemented in an artificial neural network that employs semantic orientation or Vader sentiment analysis, a number of sentiment scores for the companies over the predefined time period comprising ratings assessing the companies' behavior and policies regarding their environmental performance, social impact and governance issues.

16. The method of claim 15, wherein the subset of relevant non-environmental, social, and governance articles comprises a top number of non-environmental, social, and governance articles most similar to the environmental, social, and governance articles.

17. The method of claim 15, wherein the subset of relevant non-environmental, social, and governance articles have a similarity to the environmental, social, and governance articles above a specified threshold.

18. The method of claim 15, wherein the sentiment scores are on a scale −1 to 1.

19. The method of claim 15, wherein the environmental, social, and governance articles and non-environmental, social, and governance articles are extracted in text format.

20. The method of claim 15, wherein vectorizing the environmental, social, and governance articles and non-environmental, social, and governance articles is performed via term frequency-inverse document frequency technique.

21. The method of claim 15, wherein selecting the subset of relevant non-environmental, social, and governance articles is performed via cosine similarity scoring.

22. A system for generating sentiment scores, the system comprising:
a storage device configured to store program instructions; and
one or more processors operably connected to the storage device and configured to execute the program instructions to cause the system to:
retrieve from a database, through an application programming interface via JavaScript Object Notation format query, a number of news articles related to a number of companies published within a predefined time period;
create an artificial neural network comprising a sentiment scoring model and a environmental, social, and governance forecast model implemented as nodes in the artificial neural network;
classify the news articles as either environmental, social, and governance articles or non-environmental, social, and governance articles;
vectorize the environmental, social, and governance articles and non-environmental, social, and governance articles;
select a subset of relevant articles from the non-ESG articles;
feed the environmental, social, and governance articles and the subset of relevant non-environmental, social, and governance articles into the sentiment scoring model; and
generate, by the sentiment scoring model implemented in an artificial neural network that employs semantic orientation or Vader sentiment analysis, a number of sentiment scores for the companies over the predefined time period comprising ratings that assess the companies' behavior and policies regarding their environmental performance, social impact and governance issues.

23. The system of claim 22, wherein the subset of relevant non-environmental, social, and governance articles comprises a top number of non-environmental, social, and governance articles most similar to the environmental, social, and governance articles.

24. The system of claim 22, wherein the subset of relevant non-environmental, social, and governance articles have a similarity to the environmental, social, and governance articles above a specified threshold.

25. A computer program product for generating sentiment scores, the computer program product comprising:
a computer-readable storage media having program instructions embodied thereon to perform the steps of:
retrieving from a database, through an application programming interface via JavaScript Object Notation format query, a number of news articles related to a number of companies published within a predefined time period;
creating an artificial neural network comprising a sentiment scoring model and a environmental, social, and governance forecast model implemented as nodes in the artificial neural network;
classifying the news articles as either environmental, social, and governance articles or non-environmental, social, and governance articles;
vectorizing the environmental, social, and governance articles and non-environmental, social, and governance articles;
selecting a subset of relevant articles from the non-environmental, social, and governance articles;

feeding the environmental, social, and governance articles and the subset of relevant non-environmental, social, and governance articles into the sentiment scoring model; and generating, by the sentiment scoring model implemented in an artificial neural network that employs semantic orientation or Vader sentiment analysis, a number of sentiment scores for the companies over the predefined time period comprising ratings assessing the companies' behavior and policies regarding their environmental performance, social impact and governance issues.

26. The computer program product of claim 25, wherein the subset of relevant non-environmental, social, and governance articles comprises a top number of non-environmental, social, and governance articles most similar to the environmental, social, and governance articles.

27. The computer program product of claim 25, wherein the subset of relevant non-environmental, social, and governance articles have a similarity to the environmental, social, and governance articles above a specified threshold.

* * * * *